(12) United States Patent
Yamaguchi

(10) Patent No.: US 12,151,747 B2
(45) Date of Patent: Nov. 26, 2024

(54) WORK VEHICLE

(71) Applicant: Yanmar Holdings Co., Ltd., Osaka (JP)

(72) Inventor: Masafumi Yamaguchi, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 34 days.

(21) Appl. No.: 18/139,820

(22) Filed: Apr. 26, 2023

(65) Prior Publication Data
US 2023/0347995 A1 Nov. 2, 2023

(30) Foreign Application Priority Data
Apr. 28, 2022 (JP) ................................. 2022-074073

(51) Int. Cl.
*B62D 49/06* (2006.01)
*B60K 20/04* (2006.01)
*B60T 7/10* (2006.01)
*B60T 11/04* (2006.01)

(52) U.S. Cl.
CPC .......... *B62D 49/0692* (2013.01); *B60K 20/04* (2013.01); *B60T 7/102* (2013.01); *B60T 11/046* (2013.01)

(58) Field of Classification Search
CPC .... B60T 7/102; B60T 11/046; B62D 49/0692
See application file for complete search history.

(56) References Cited

U.S. PATENT DOCUMENTS 3,472,096 A * 10/1969 Krause .................. B60T 11/046
74/501.6
2012/0018261 A1* 1/2012 Kwon ..................... B60T 7/102
188/72.9

FOREIGN PATENT DOCUMENTS

JP  2018-167811 A  11/2018
KR  200151586 Y1 * 7/1999  ............ B60T 11/046

* cited by examiner

*Primary Examiner* — Faye M Fleming
(74) *Attorney, Agent, or Firm* — NORTON ROSE FULBRIGHT US LLP

(57) ABSTRACT

A work vehicle includes a parking brake lever, right and left braking arms, and an intermediate link mechanism configured to couple the parking brake lever and each of the braking arms. The intermediate link mechanism includes a support shaft configured to rotate, left and right coupling units that are coupled to the support shaft and configured to rotate each of the braking arms in response to a rotational movement of the support shaft, and a cable mechanism having a control cable. The cable mechanism is configured to rotate the support shaft via the control cable in response to a rotational movement of the parking brake lever.

7 Claims, 12 Drawing Sheets

WORK VEHICLE

CROSS-REFERENCE TO RELATED APPLICATIONS

This application claims priority under 35 U.S.C. § 119 to JP Application No. 2022-074073 filed Apr. 28, 2022 the entire contents of which are hereby incorporated by reference.

TECHNICAL FIELD

The present invention relates to a work vehicle.

BACKGROUND ART

Conventionally, technologies related to structures of parking brakes have been proposed for tractors and other work vehicles. For example, in a parking brake structure disclosed in Patent Document 1, a parking brake lever is connected to two parking brake wires via an equalizer body. The parking brake wires are coupled to left and right braking arms, respectively. This allows an operating force of the single parking brake lever to act equally on the left and right braking arms.

PRIOR ART DOCUMENT

Patent Document

Patent Document 1: Japanese Unexamined Patent Application Publication No. 2018-167811

SUMMARY OF INVENTION

Technical Problem

However, the structure disclosed in Patent Document 1 requires the two parking brake wires (also called control cables) corresponding to the left and right braking arms, and there is room for improvement in that an arrangement thereof tends to be complicated. There is also room for improvement in that the two control cables require adjustment work due to aging, which makes maintenance more troublesome.

The present invention was made to solve the above problems, the purpose of which is to provide a work vehicle that can avoid a complicated control cable arrangement and eliminate troublesomeness of maintenance such as adjustment work due to aging of the control cable.

Solution to Problem

The work vehicle according to an aspect of the invention comprises a parking brake lever, right and left braking arms; and an intermediate link mechanism coupling the parking brake lever and each of the braking arms, in which the intermediate link mechanism includes a support shaft that rotates, left and right coupling units that are coupled to the support shaft and rotate each of the braking arms in response to a rotational movement of the support shaft, and a cable mechanism having a control cable, and the cable mechanism rotates the support shaft via the control cable in response to a rotational movement of the parking brake lever.

Advantageous Effects of Invention

According to the above configuration, the complicated control cable arrangement can be avoided and the troublesomeness of maintenance such as adjustment work due to aging of the control cables can be eliminated.

DESCRIPTION OF EMBODIMENTS

Figure 1:
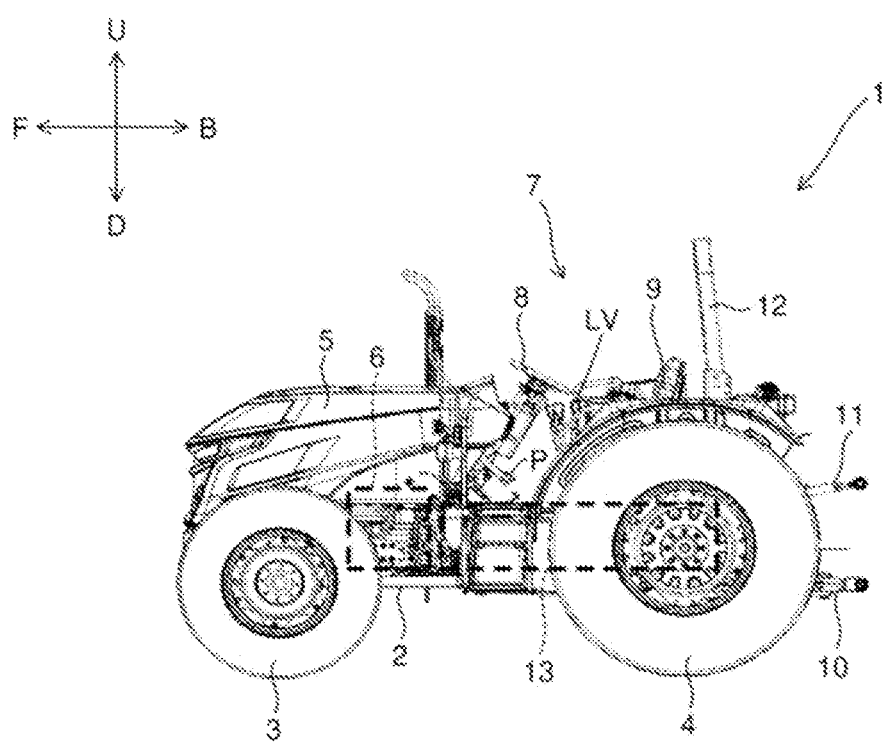
FIG. 1 is a side view of a schematic configuration of a tractor which is an example of a work vehicle according to an embodiment of the present invention.

Now, an embodiment of the present invention is described below with reference to the drawings. In the present embodiment, a tractor will be described as an example of a work vehicle. In addition to the tractor, examples of the work vehicle include riding work vehicles such as various types of harvesters, rice transplanters, combine harvesters, civil engineering and construction work devices, and snowplows.

In the present specification, directions will be defined as follows. First, a direction in which the tractor as the work vehicle advances during work is set as "front", and a reverse direction thereof is set as "back". A right side of the advancing direction of the tractor is set as right, and a left side thereof is set as left. A perpendicular direction to a front-back direction and a left-right direction of the tractor is set as an up-down direction. At this time, a direction of a gravitational force is set as down, and an opposite side thereof is set as up. In the drawings, the front direction is indicated by F, the back direction by B, the left direction by L, the right direction by R, the up direction by U, and the down direction by D.

[1. Schematic Configuration of Tractor]

FIG. 1 is a side view of a schematic configuration of a tractor 1 which is an example of a work vehicle of the present embodiment. The tractor 1 comprises a vehicle body 2. A front part of the vehicle body 2 is supported by a pair of left and right front wheels 3. A back part of the vehicle body 2 is supported by a pair of left and right rear wheels 4.

A hood 5 is arranged in the front part of the vehicle body 2. An engine 6 as a drive source is located below the hood 5. The engine 6 is composed of a diesel engine, for example, but is not limited to this and may be composed of a gasoline engine, for example.

Behind the engine 6 in the vehicle body 2, a driver seat area 7 is provided for an operator (driver). The driver seat area 7 is provided with a steering wheel 8 for the driver to make a steering operation, and a driver's seat 9 on which the driver sits. The driver seat area 7 is also provided with operation levers LV, pedals P, etc., which are operated by the driver.

A three-point link mechanism is provided on a back side of the vehicle body 2. The three-point linkage mechanism is configured to include a pair of right and left lower links 10 and an upper link 11. At the three-point link mechanism, a work instrument can be mounted. The work instrument can be, for example, but is not limited to, a cultivator, a plow, or a fertilizing device. A lifting-lowering device (hydraulic lift unit 100 in FIG. 9) with a hydraulic unit such as a lifting-lowering cylinder is provided at the back side of the vehicle body 2. The lifting-lowering device lifts and lowers the three-point link mechanism, thereby making it possible to lift and lower the work instrument.

In the vehicle body 2, a roll-over protection structure (ROPS) frame 12 is provided at a back part of the driver seat area 7 (driver's seat 9). The tractor 1 of the present embodiment has a driver's seat 9 that is not covered by a cabin. Therefore, the ROPS frame 12 is provided for a purpose of protecting the driver in the event that the tractor 1 turns over.

In the vehicle body 2, a transmission case 13 is located behind the engine 6 and below the driver seat area 7. A power transmission device (not illustrated)) is located inside the transmission case 13. Rotational power of the engine 6 is transmitted to at least one of a front wheel 3 and a rear wheel 4 via the power transmission device in the transmission case 13.

Figure 2:
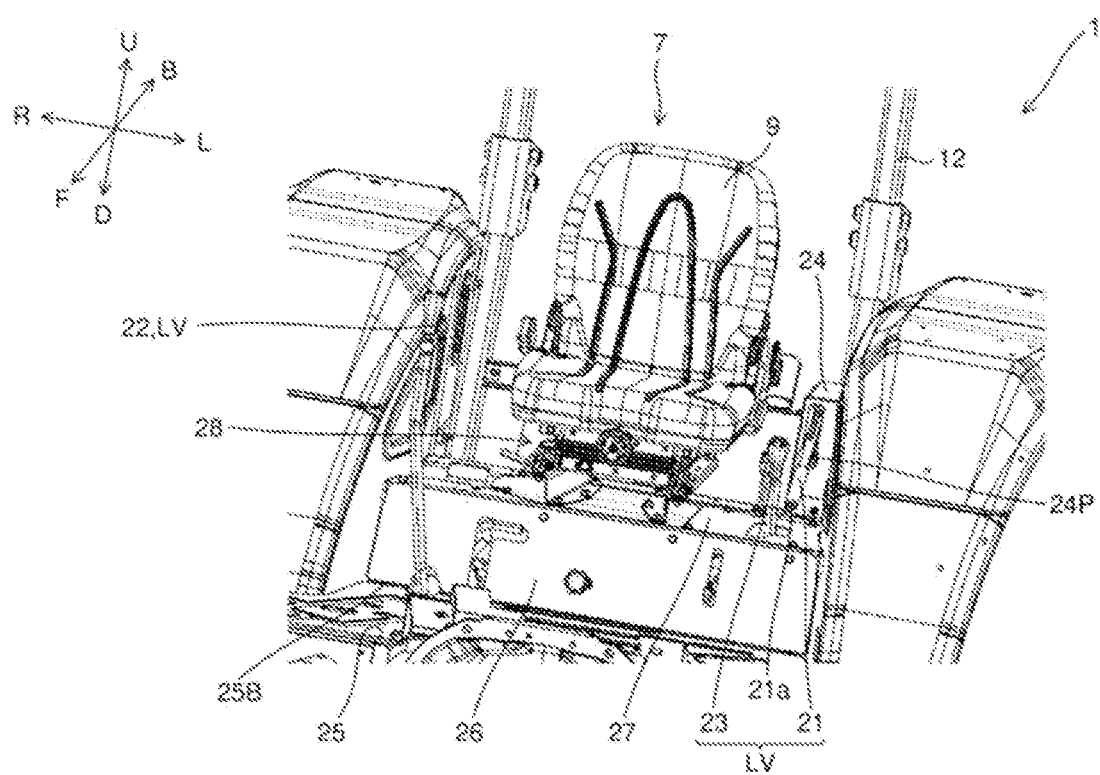
FIG. 2 is a perspective view of a driver seat area of the tractor, viewed from front.

FIG. 2 is a perspective view of the driver seat area 7 of the tractor 1, viewed from front. Around the driver's seat 9 of the driver seat area 7, there are arranged, as the operation levers LV, a parking brake lever 21, a main speed change lever 22, and an auxiliary speed change lever 23, etc.

The parking brake lever 21 is a lever operated by the driver when parking the tractor 1 and is located to a left side of the driver's seat 9. The driver can maintain the left and right rear wheels 4 (see FIG. 1) in a braking state by pulling up (rotating upward) the parking brake lever 21. The driver can also release the braking state of the left and right rear wheels 4 by pressing a release button 21a provided on a tip end of the parking brake lever 21 and rotating the parking brake lever 21 downward. The tractor 1 thus comprises the parking brake lever 21.

A rotating mechanism of the parking brake lever 21 is housed in a lever frame 24. The parking brake lever 21 is provided through an opening 24P formed in a front surface part of the lever frame 24 and protruding forward.

The main speed change lever 22 is a lever operated by the driver when increasing or decreasing a traveling speed of the tractor 1, and is located on a front right side of the driver's seat 9. The auxiliary speed change lever 23 is a lever operated by the driver when switching an output range of a traveling auxiliary speed change gear mechanism in the transmission case 13 (see FIG. 1), and is located on the left side of the driver's seat 9 and in front of the parking brake lever 21. Both the main speed change lever 22 and the auxiliary speed change lever 23 are connected to the transmission case 13.

The tractor 1 is further provided with a floor surface part 25 and a support plate 26. The floor surface part 25 is located in front of and below the driver's seat 9. The floor surface part 25 provides a foothold for the driver sitting on the driver's seat 9. The support plate 26 is a plate-shaped member that rises from a rear end part 25B of the floor surface part 25 toward a front of the driver's seat 9. The support plate 26 is coupled to a bottom plate part 27. The bottom plate part 27 is located below the driver's seat 9 and supports the driver's seat 9 via an adjustment mechanism 28. The adjustment mechanism 28 is a mechanism for adjusting a position of the driver's seat 9 in the front-back direction.

[2. Parking Brake Structure]

Figure 3:
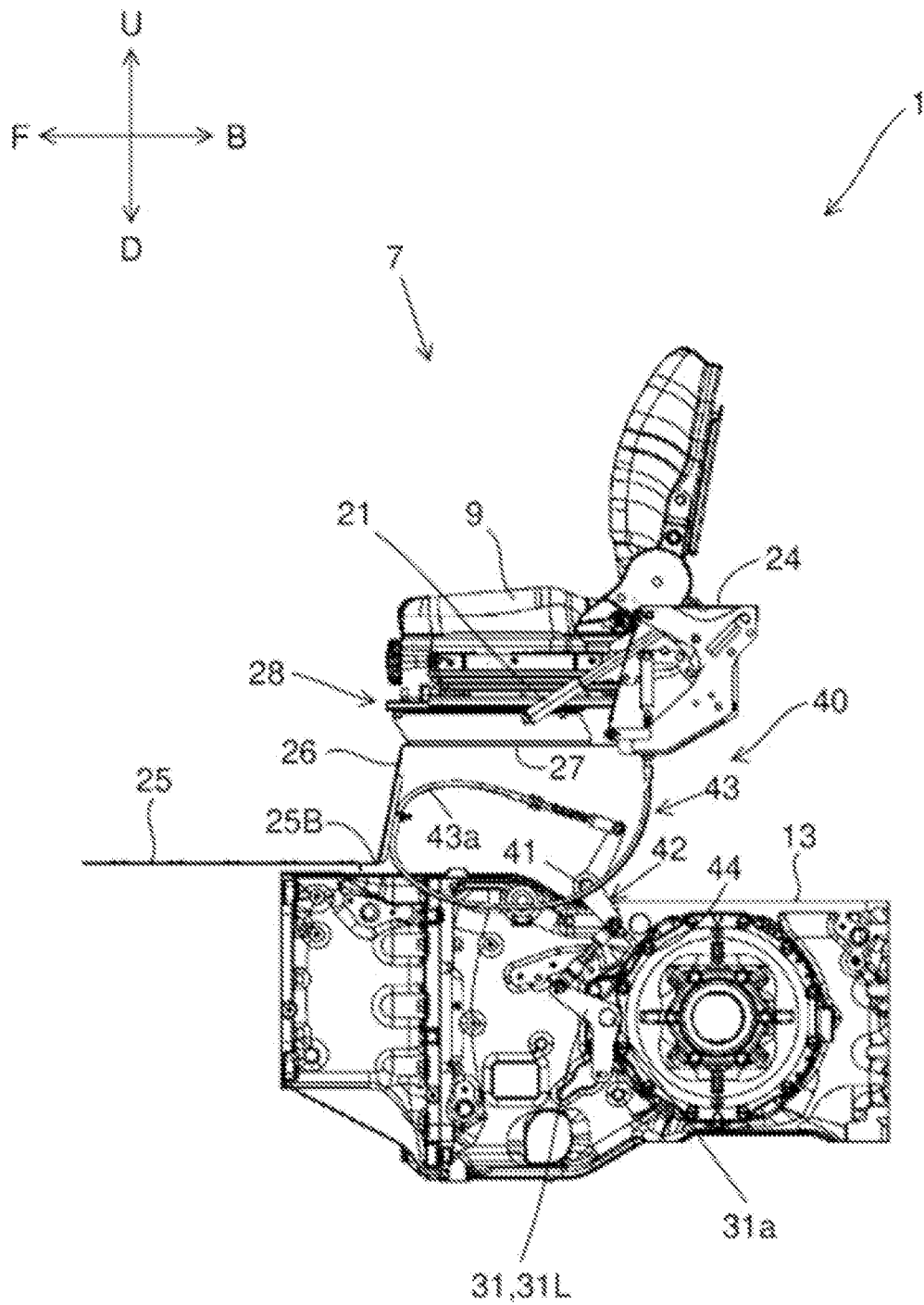
FIG. 3 is a left side view illustrating an internal configuration below a driver's seat of the tractor.

FIG. 3 is a left side view illustrating an internal configuration below the driver's seat 9 of the tractor 1. The tractor 1 comprises a braking arm 31. The braking arm 31 is rotatably mounted to a left side surface and a right side surface of the transmission case 13. In more detail, the braking arm 31 has a shape bent at approximately 90° in side view (V-shape) and has a shaft part 31a near a portion that is bent, which serves as a rotation center. The shaft part 31a is located extending in the left-right direction.

Figure 4:
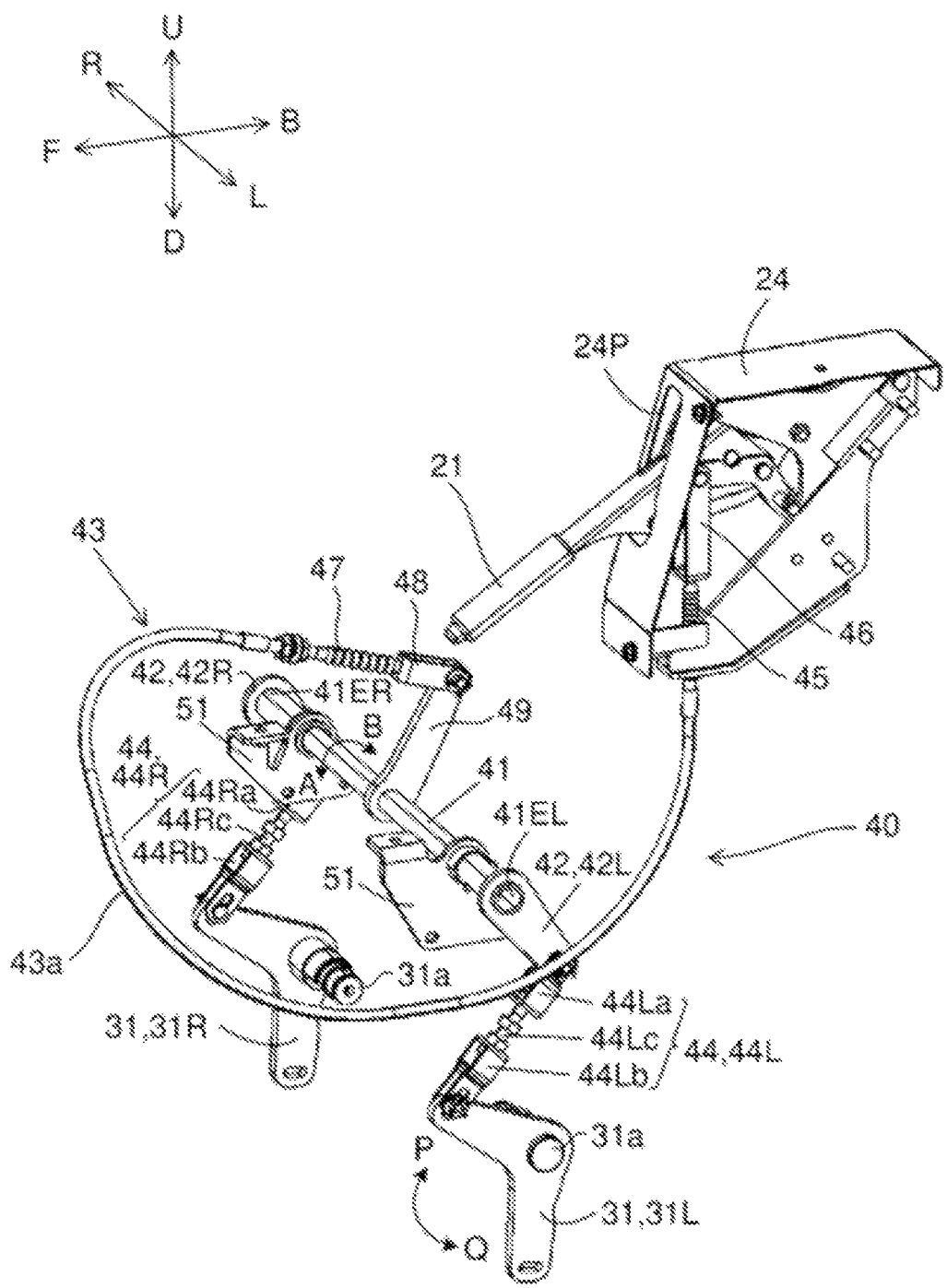
FIG. 4 is a perspective view illustrating a detailed configuration of an intermediate link mechanism provided in the tractor.

When distinguishing between the left and right braking arms 31 in particular, the left side braking arm 31 is referred to as a braking arm 31L and the right side braking arm 31 is referred to as a braking arm 31R (see FIG. 4). Rotation of the left and right braking arms 31L and 31R activates a brake mechanism (not illustrated) inside the transmission case 13, thereby braking of the rear wheels 4 caused by the brake mechanism or releasing the braking of the rear wheels 4 is performed. The tractor 1 thus comprises the left and right braking arms 31.

In the following explanation, when distinguishing between a pair of left and right members, following the example of the braking arm 31 above, the left side member is denoted by a sign "L", which indicates a left side, after the reference sign of the above member. The right side member is denoted a sign "R", which indicates a right side, after the reference sign of the member. When there is no need to distinguish between a pair of left and right members, only the same reference sign is attached to both the left and right side members.

As illustrated in FIG. 3, the tractor 1 is further provided with an intermediate link mechanism 40. The intermediate link mechanism 40 is a mechanism that couples the parking brake lever 21 to each of the braking arms 31.

FIG. 4 is a perspective view illustrating a detailed configuration of the intermediate link mechanism 40. The intermediate link mechanism 40 includes a support shaft 41, left and right coupling units 42, and a cable mechanism 43. The support shaft 41 is located extending in the left-right direction. The support shaft 41 rotates around a central axis extending in the left-right direction. The support shaft 41 is rotatably supported by the transmission case 13 (see FIG. 3) via a support stay 51.

The left and right coupling units 42 are coupled to the support shaft 41 and rotate each of the braking arms 31 in response to a rotational movement of the support shaft 41.

More specifically, one end part of a left side coupling unit 42L is coupled to a left end part 41EL of the support shaft 41, and an other end part of the left side coupling unit 42L is coupled to the left side braking arm 31L via a left side mounting unit 44L. Here, the mounting unit 44L comprises a first left bracket 44La, a second left bracket 44Lb, and a left rod 44Lc with a turnbuckle. The first left bracket 44La is coupled to the coupling unit 42L. The second left bracket 44Lb is coupled to the braking arm 31L. The left rod 44Lc couples the first left bracket 44La in such a manner that a distance between each other is adjustable, and the left rod 44Lc couples the second left bracket 44Lb in such a manner that a distance between each other is adjustable.

A right side coupling unit 42R has a similar configuration as the left side coupling unit 42L. In other words, one end part of the right side coupling unit 42R is coupled to a right end part 41ER of the support shaft 41, and an other end part of the right side coupling unit 42R is coupled to the right side braking arm 31R via a right side mounting unit 44R. Here, the right side mounting unit 44R comprises a first right bracket 44Ra, a second right bracket 44Rb, and a right rod 44Rc with a turnbuckle. The first right bracket 44Ra is coupled to the coupling unit 42R. The second right bracket 44Rb is coupled to the braking arm 31R. The right rod 44Rc couples the first right bracket 44Ra in such a manner that a distance between each other is adjustable, and the right rod 44Rc couples the second right bracket 44Rb in such a manner that a distance between each other is adjustable.

Therefore, when the support shaft 41 rotates, the left and right coupling units 42 coupled to both ends of the support shaft 41 also rotate, and the left and right braking arms 31 rotate around the shaft part 31a via the left and right mounting units 44.

The cable mechanism 43 has a control cable 43a. The control cable 43a has a wire (inner cable) inside a tube-shaped cable cover. On a side coupled to the parking brake lever 21 in the control cable 43a, an end part of the cable cover is fixed to a bottom part of the lever frame 24, and the wire inside passes through the bottom part and is coupled to a cable bracket 46 via a lever side mounting member 45. The cable bracket 46 is coupled to the parking brake lever 21 and slides the wire relative to the cable cover following rotation of the parking brake lever 21.

On an opposite side to the side coupled to the parking brake lever 21 in the control cable 43a, the cable cover is supported by a support member (not illustrated) and the wire inside is coupled to a mounting bracket 48 via a support shaft side mounting member 47. The mounting bracket 48 is coupled to one end part of a coupling arm 49 in a relatively rotatable manner. The coupling arm 49 (an other end part of the coupling arm 49) is mounted to a central part of the support shaft 41 in the left-right direction.

In the above configuration, when the driver rotates the parking brake lever 21 upward, the cable bracket 46 coupled to the parking brake lever 21 pulls one end part of the wire of the control cable 43a. Accordingly, the mounting bracket 48, which is coupled to an other end part of the wire via the support shaft side mounting member 47, is pulled forward. As a result, the coupling arm 49, together with the support shaft 41, rotates in a direction A in FIG. 4, around the support shaft 41.

When the support shaft 41 rotates in the direction A, the left and right coupling units 42 coupled to the both ends of the support shaft 41 also rotate in the direction A, and the left and right braking arms 31 rotate in a direction P in FIG. 4 around the shaft part 31a via the left and right mounting units 44. Rotation of the braking arm 31 in the direction P activates the brake mechanism inside the transmission case 13, thereby the rear wheels 4 are in a braking state.

On the other hand, when the driver rotates the parking brake lever 21 downward, pulling of the wire of the control cable 43a is released. As a result, the mounting bracket 48 is returned backward via the support shaft side mounting member 47, and the coupling arm 49, together with the support shaft 41, rotates in a direction B in FIG. 4 around the support shaft 41 and returns to an original position (position before rotation) thereof.

When the support shaft 41 rotates in the direction B, the left and right coupling units 42 coupled to the both ends of the support shaft 41 also rotate in the direction B, and via the left and right mounting units 44, the left and right braking arms 31 rotate in a direction Q in FIG. 4 around the shaft part 31a. Rotation of the braking arm 31 in the direction Q releases the braking state of the rear wheels 4 caused by the brake mechanism inside the transmission case 13.

As described above, in the present embodiment, the cable mechanism 43 of the intermediate link mechanism 40 rotates the support shaft 41 via the control cable 43a in response to a rotational movement of the parking brake lever 21.

Since the left and right braking arms 31 can be rotated via the left and right coupling units 42 by rotating the support shaft 41, as for the cable (wire) used by the cable mechanism 43, only a single cable (control cable 43a) is needed to rotate the support shaft 41. In other words, the number of the control cables 43a to be used can be fewer than the conventional two.

As a result, it is possible to avoid a complicated arrangement of the control cable 43a (routing of control cable 43a). It is also possible to eliminate troublesomeness of maintenance such as adjustment work due to aging of the control cable 43a. Furthermore, since a single control cable 43a can operate the left and right braking arms 31, even if deterioration of the control cable 43a (e.g., elongation of the inner cable) occurs, it is possible to avoid changes in load transmitted to the left and right braking arms 31. This allows braking to be applied by operating the braking arm 31 with an equal load on right and left.

From a viewpoint of securing mounting space for other members (e.g., coupling arm 49) in the center part of the support shaft 41 in the left-right direction, the left and right braking arms 31 are preferably coupled to the support shaft 41 as in the present configuration. In other words, the left side braking arm 31L is preferably coupled to the left end part 41EL of the support shaft 41 via the left side coupling unit 42L, and the right side braking arm 31R is preferably coupled to the right end part 41ER of the support shaft 41 via the right side coupling unit 42R.

From a viewpoint of securely rotating the left and right braking arms 31 with a configuration using the single control cable 43a, a configuration in which the coupling arm 49 is mounted to the center part of the support shaft 41 in the left-right direction and the support shaft 41 is rotated via the control cable 43a and the coupling arm 49, as in the present embodiment, is preferable. In other words, it is preferable that one end part of the control cable 43a is coupled to the parking brake lever 21 (via the lever side mounting member 45 and cable bracket 46) and an other end part of the control cable 43a is coupled to the coupling arm 49 (via the support shaft side mounting member 47 and mounting bracket 48).

As illustrated in FIG. 3, the tractor 1 of the present embodiment comprises the driver's seat 9 and the transmission case 13. The transmission case 13 is located below the driver's seat 9. In this configuration, from a viewpoint of effectively utilizing a space between the driver's seat 9 and the transmission case 13 as a location space for the support shaft 41 and an arrangement space for the control cable 43a, it is preferable that the support shaft 41 of the intermediate link mechanism 40 is located between the driver's seat 9 (especially the bottom plate part 27) and the transmission case 13.

Figure 5:
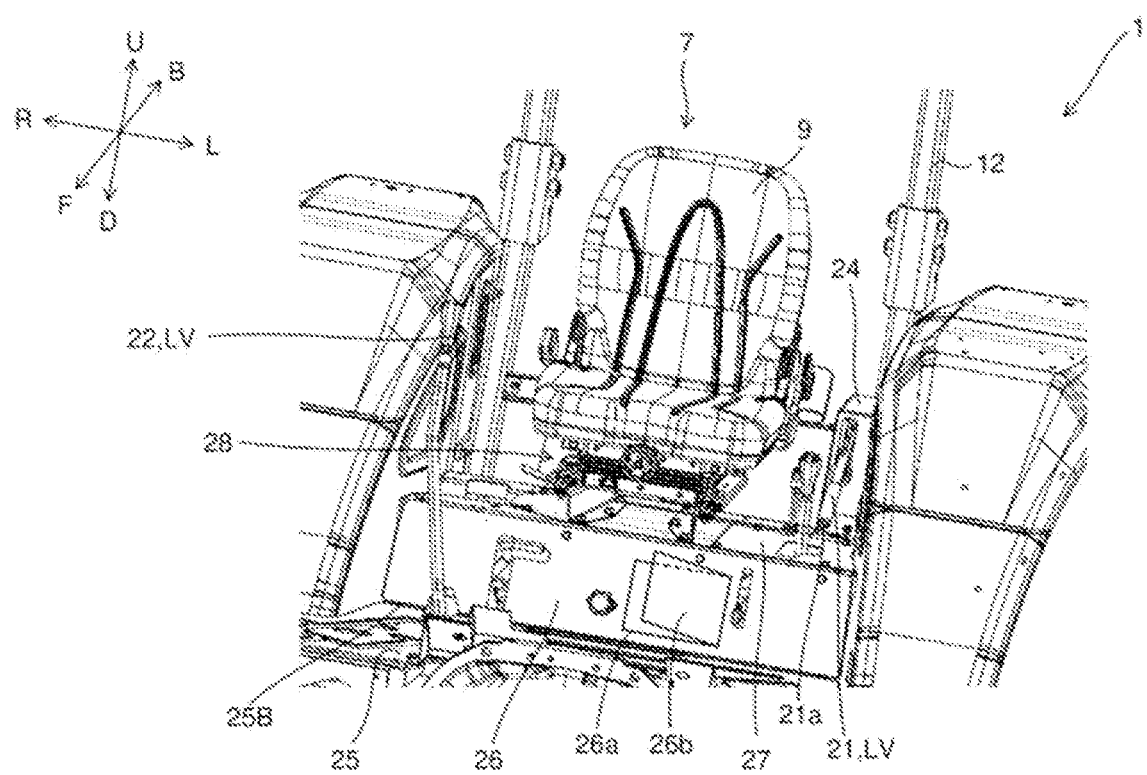
FIG. 5 is a perspective view of the driver seat area of the tractor in an other configuration, viewed from front.

FIG. 5 is a perspective view of the driver seat area 7 of the tractor 1 in an other configuration, viewed from front. The support plate 26 of the driver seat area 7 may have an opening 26a and a lid 26b. The opening 26a is rectangular in shape, but may be circular, oval, or polygonal in shape other than rectangular. A shape and size of the opening 26a are not limited. The lid 26b is a member that closes or opens the opening 26a. The lid 26b consists, for example, of a door that rotates relative to the opening 26a. The lid 26b may consist of a door that slides relative to the opening 26a, or may consist of a lid that can be attached to or detached from the opening 26a, or the like.

In a configuration where the support shaft 41 is located between the driver's seat 9 and the transmission case 13, for example, by rotating the lid 26b to open the opening 26a of the support plate 26, the support shaft 41 of the intermediate link mechanism 40, the control cable 43a, and the like are visible through the opening 26a. Then, maintenance of the support shaft 41, the control cable 43a, and the like can also be performed through the opening 26a. In other words, from a viewpoint of facilitating the maintenance described above, it is preferable that the support plate 26 has the opening 26a and the lid 26b.

[3. Speed Change Lever Cover]

Figure 6:
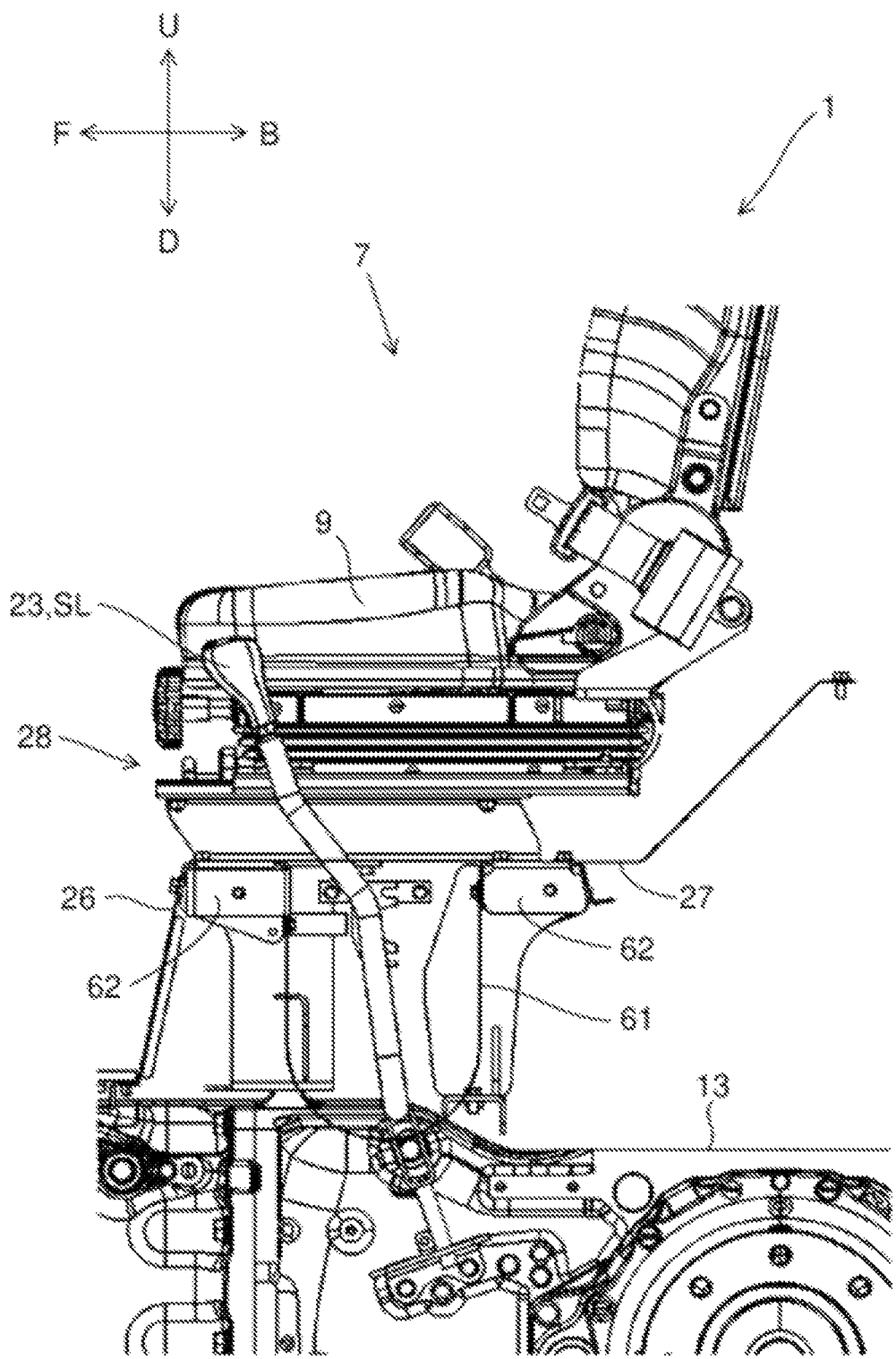
FIG. 6 is a left side view illustrating a configuration near an auxiliary speed change lever of the tractor illustrated in FIG. 1.
Figure 7:
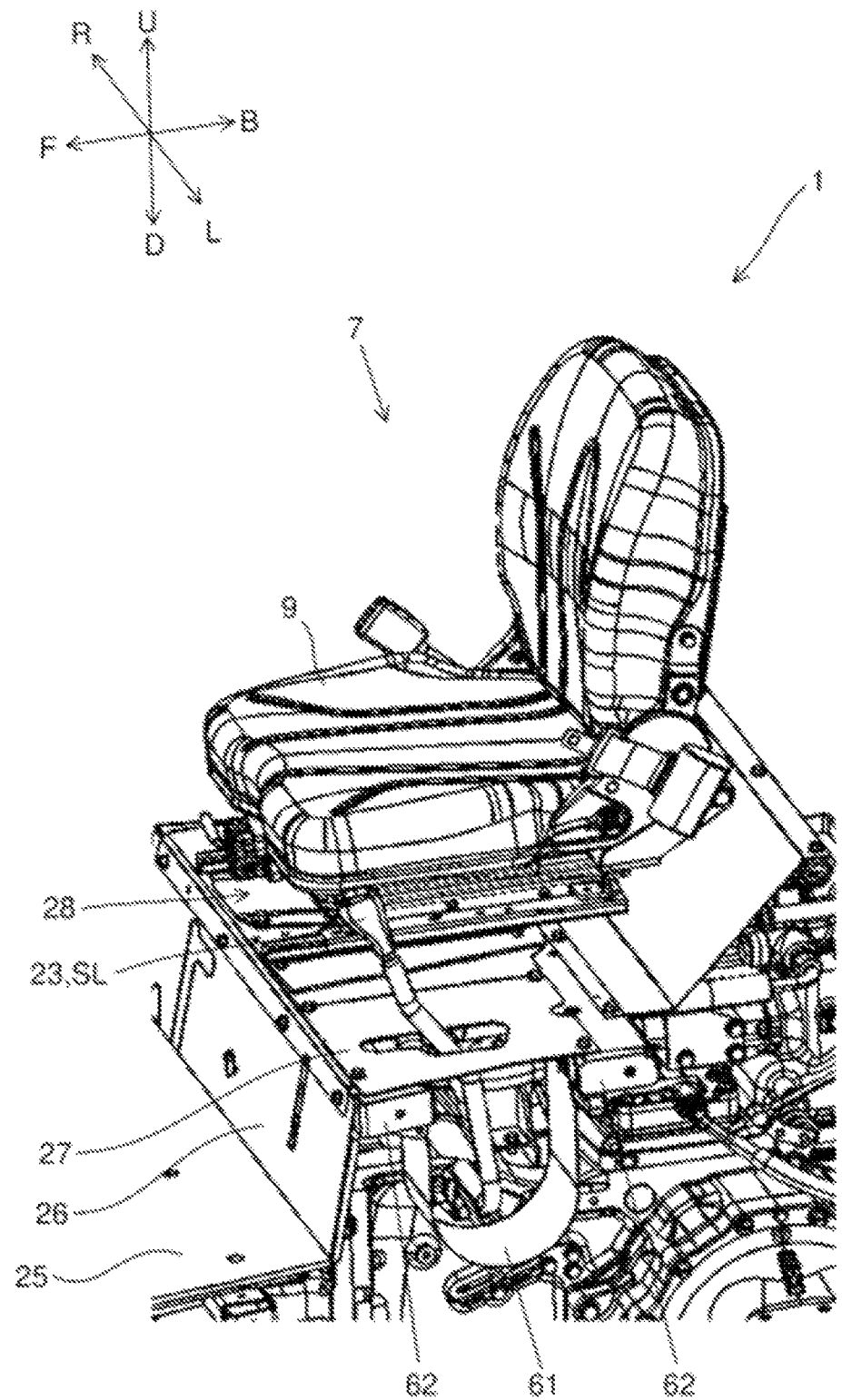
FIG. 7 is a perspective view of the auxiliary speed change lever, viewed from front.
Figure 8:
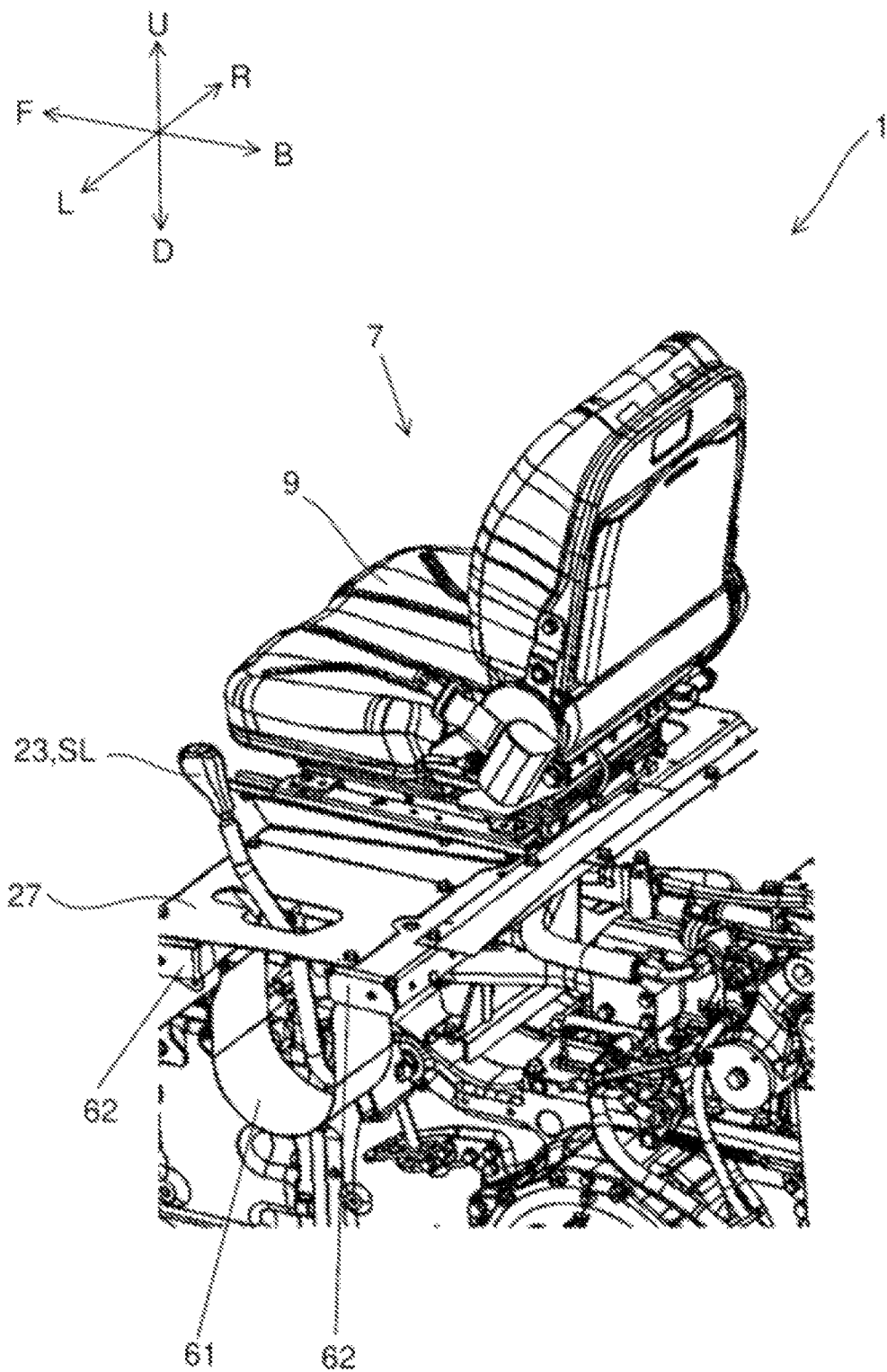
FIG. 8 is a perspective view of the auxiliary speed change lever, viewed from back.

FIG. 6 is a left side view illustrating a configuration near the auxiliary speed change lever 23 in the driver seat area 7 of the tractor 1. FIG. 7 is a perspective view of the auxiliary speed change lever 23 viewed from front. FIG. 8 is a perspective view of the auxiliary speed change lever 23, viewed from back. In these drawings, the parking brake lever 21, the braking arm 31, the intermediate link mechanism 40, and the like of the present embodiment described above are omitted for convenience.

A cover member 61 is located below the aforementioned auxiliary speed change lever 23. As illustrated in FIG. 6, etc., the cover member 61 is a thin metal sheet arranged in a curved U shape in the side view. Both ends of the cover member 61 are coupled to the bottom plate part 27 via mounting stays 62. The shape of the cover member 61 in side view is not limited to the U shape described above, but may be other shapes such as an L shape. The cover member 61 may be a flat plate shape without a portion that is bent.

When the tractor 1 is traveling, rotation of the rear wheels 4 (see FIG. 1) may cause soil, sand, mud, etc. to rise up from ground and adhere to the auxiliary speed change lever 23 and other members (e.g., guide plate). If the raised soil, etc. adheres to the auxiliary speed change lever 23 and the like, there is concern that the auxiliary speed change lever 23 may rub against other members through the adhered soil, etc. when the auxiliary speed change lever 23 is operated, resulting in wear of the auxiliary speed change lever 23. From a viewpoint of reducing such a situation, it is preferable to have a configuration in which the cover member 61 is located below the auxiliary speed change lever 23 to reduce adhesion of soil, etc. that is raised up from the ground to the auxiliary speed change lever 23 and the like.

From the same viewpoint, it is preferable to have a configuration in which a cover member is also located below the main speed change lever 22 (see FIG. 2) to reduce adhesion of soil, etc. that is raised up from the ground to the main speed change lever 22 and the like.

To summarize the above points, when the auxiliary speed change lever 23 and the main speed change lever 22 are used as speed change levers SL, the tractor 1 preferably comprises the speed change levers SL connected to the transmission case 13 and a cover member (for example, cover member 61) located below the speed change levers SL.

In particular, from the viewpoint of reducing wear of the auxiliary speed change lever 23 caused by the adhesion of soil, etc., raised up from the ground, it is preferable that the speed change levers SL include the auxiliary speed change lever 23 and that the cover member 61 is located below the auxiliary speed change lever 23 as in the present embodiment.

[4. Hydraulic Lift Unit]

Figure 9:
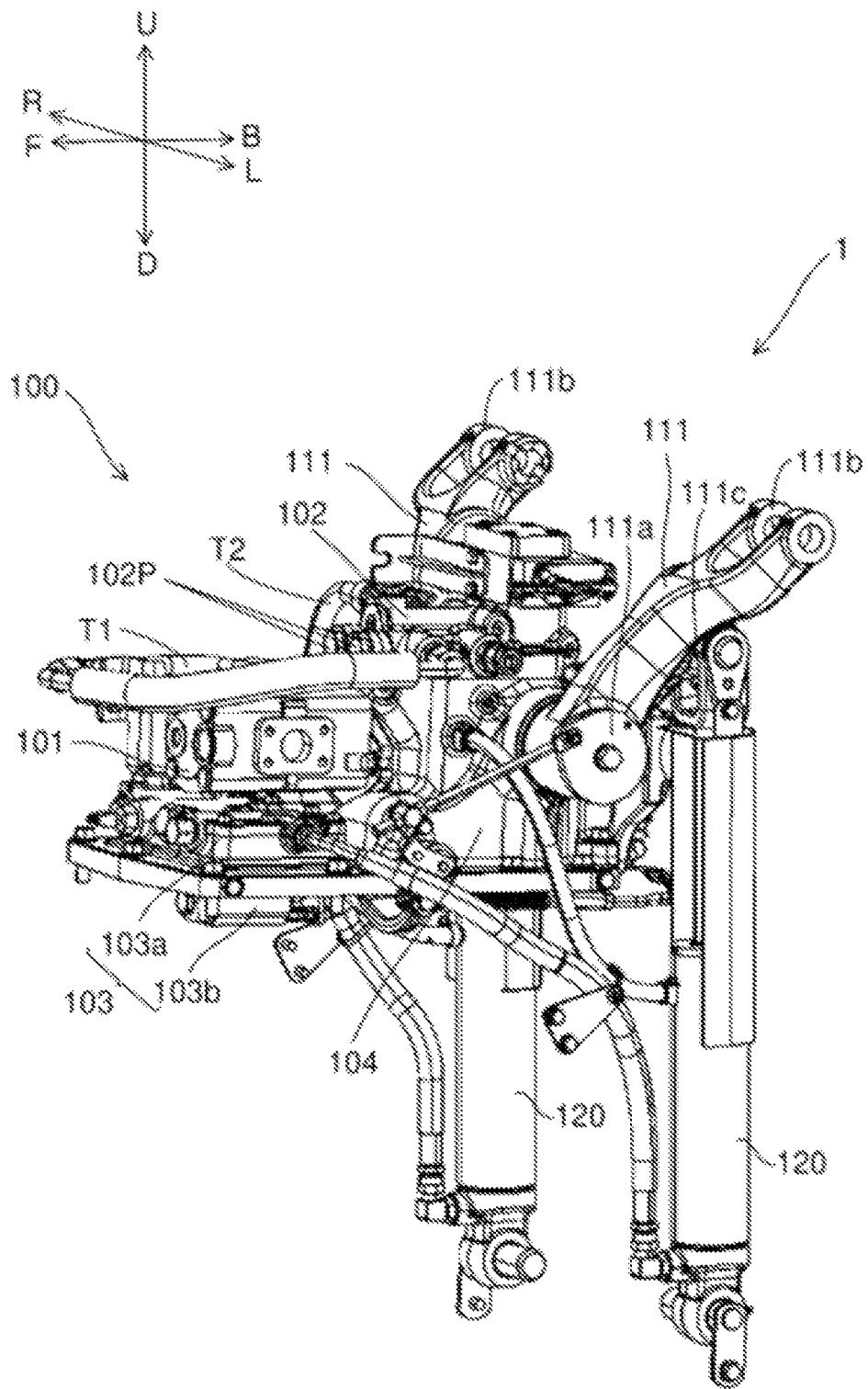
FIG. 9 is a perspective view illustrating a configuration of a hydraulic lift unit of the tractor.

FIG. 9 is a perspective view illustrating a configuration of the hydraulic lift unit 100. The tractor 1 of the present embodiment comprises the hydraulic lift unit 100. The hydraulic lift unit 100 is a unit for lifting and lowering a work instrument (e.g., cultivator).

The hydraulic lift unit 100 comprises a gear pump 101, a first valve plate 102, a valve set 103, and a lift housing 104. The valve set 103 includes a second valve plate 103a and a mechanical lifting-lowering valve 103b.

The gear pump 101 is a discharge pump that discharges hydraulic oil and is driven by the engine 6 (see FIG. 1). Both the first valve plate 102 and the second valve plate 103a are cast products (cast blocks) made of aluminum alloy or gray cast iron or other materials. A plurality of oil paths are formed aggregately inside the first valve plate 102 and the second valve plate 103a. The gear pump 101 is coupled to the oil paths of the first valve plate 102 via a pressure oil pipe T1. The first valve plate 102 is coupled to the oil paths of the second valve plate 103a via a pressure oil pipe T2.

Two external take-out ports 102P are provided at a front part of the first valve plate 102. The two external take-out ports 102P each are a port for taking out the hydraulic oil flowing inside the first valve plate 102 to outside, and are provided side by side in the left-right direction.

The gear pump 101, the first valve plate 102, and the valve set 103 are mounted on the lift housing 104. The lift housing 104 is mounted on a top surface of the transmission case 13 (see FIG. 1). Therefore, the hydraulic lift unit 100 is located above the transmission case 13.

Figure 10:
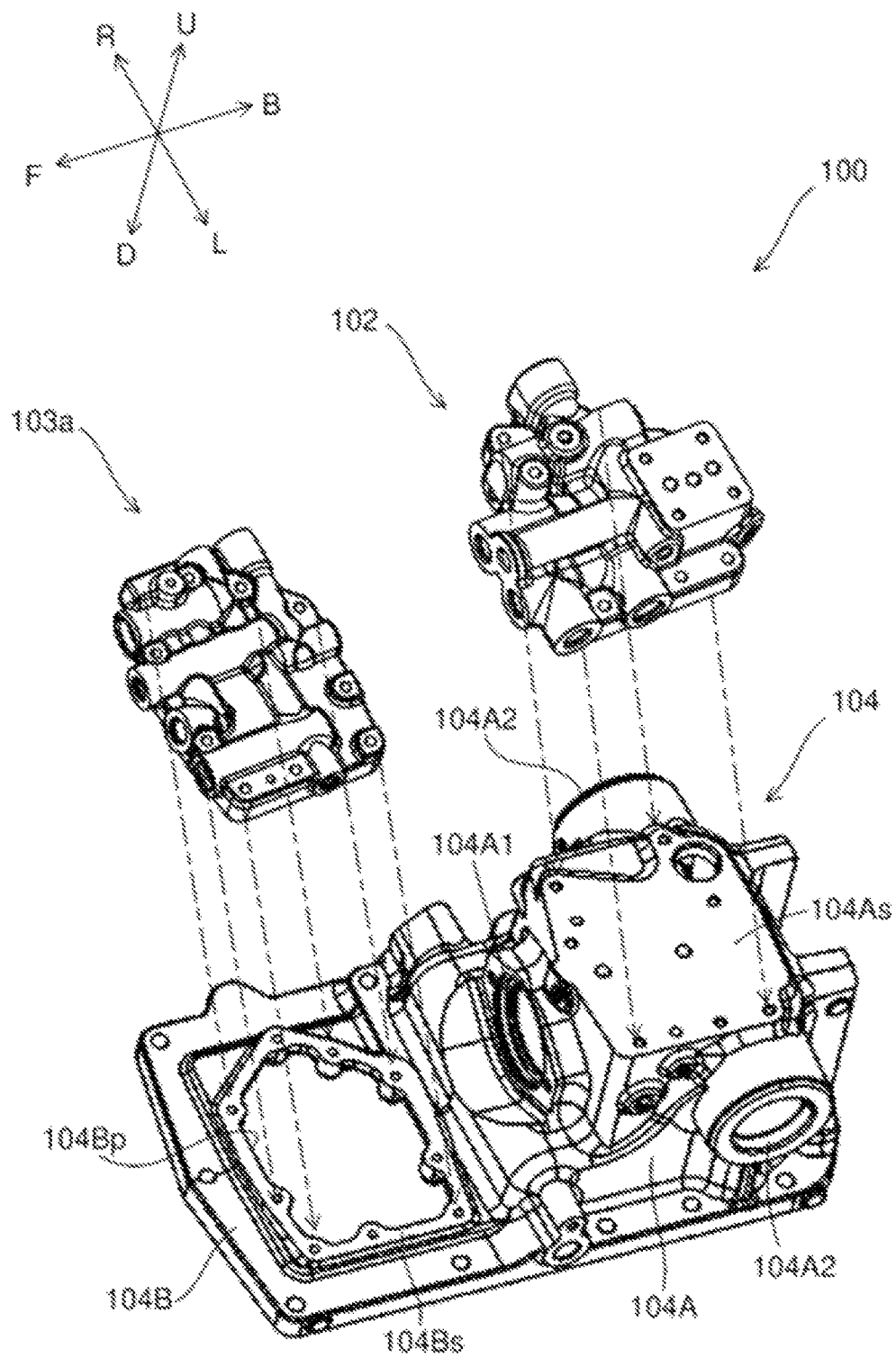
FIG. 10 is an exploded perspective view of a first valve plate, a second valve plate, and a lift housing in the hydraulic lift unit.

FIG. 10 is an exploded perspective view of the first valve plate 102, the second valve plate 103a, and the lift housing 104 in the hydraulic lift unit 100.

The lift housing 104 is a cast product made of aluminum alloy or gray cast iron or other materials. The lift housing 104 has a base part 104A and a frame part 104B.

An interior of the base part 104A is hollow and has a shape that protrudes upward. An opening 104A1 is formed in a front surface part of the base part 104A, into which a rotating shaft 101a (see FIG. 12) of the gear pump 101 or the like is inserted. Left and right side surface parts of the base part 104A are each provided with an opening 104A2 into which a rotational shaft part 111a of a lift arm 111 (see FIG. 9) described below is inserted.

The frame part 104B is coupled to a front of the base part 104A. The frame part 104B is a frame shape and has an opening 104Bp penetrating in the up-down direction. A mounting seat surface 104Bs is formed around the opening 104Bp.

The first valve plate 102 is fastened to a top surface 104As of the base part 104A of the lift housing 104 using bolts. The second valve plate 103a is fastened to the mounting seat surface 104Bs of the frame part 104B of the lift housing 104 using bolts. The gear pump 101 (see FIG. 9) is mounted on a bottom part of the second valve plate 103a. As a result, the gear pump 101 is located protruding downward through inside of the opening 104Bp of the frame part 104B.

As illustrated in FIG. 9, a pair of left and right lift arms 111 for lifting and lowering a work instrument are mounted to a back part of the lift housing 104. A base end part of each lift arm 111 comprises the rotational shaft part 111a that extends in the left-right direction. Left and right rotational shaft parts 111a are rotatably supported at back side parts of the lift housing 104.

A bracket 111*b* is formed at a tip end part of each lift arm 111 opposite the base end part (rotational shaft part 111*a*). For example, the bracket 111*b* of the right side lift arm 111 is coupled to the right side lower link 10 (see FIG. 1) via an attitude control cylinder (not illustrated). For example, the bracket 111*b* of the left side lift arm 111 is coupled to the left side lower link 10 via a lift rod (not illustrated). A positional relationship between the posture control cylinder and the lift rod may be reversed from left to right.

A boss part 111*c* is provided at the midpoint between the base end part and the tip end part of each lift arm 111. The boss part 111*c* of each of the left and right lift arms 111 is respectively coupled to each of the left and right lower links 10 (see FIG. 1) via a lift cylinder 120.

In the above configuration, when left and right lift cylinders 120 are extended, that is, when a piston rod of each lift cylinder 120 is pushed out of a cylinder tube, the left and right lift arms 111 rotate upward. The left and right lift arms 111 then lift the left and right lower links 10 via the attitude control cylinder or the lift rod. Consequently, height of the work instrument is increased.

Conversely, when the left and right lift cylinders 120 contract, that is, when the piston rod of each lift cylinder 120 is retracted into the cylinder tube, the left and right lift arms 111 rotate downward. The left and right lift arms 111 then push down the left and right lower links 10 via the attitude control cylinder or the lift rod. Consequently, the height of the work instrument is lowered.

When the posture control cylinder is extended, only the lower link 10 on a side where the posture control cylinder is mounted (e.g., right side) rotates downward. As a result, the work instrument tilts toward the side where the attitude control cylinder is mounted (e.g., the work instrument becomes downward to right). Conversely, when the attitude control cylinder is retracted, only the lower link 10 on the side where the attitude control cylinder is mounted (e.g., right side) rotates upward. As a result, the work instrument tilts to a side opposite to the side where the attitude control cylinder is mounted (e.g., the work instrument becomes downward to left).

Figure 11:
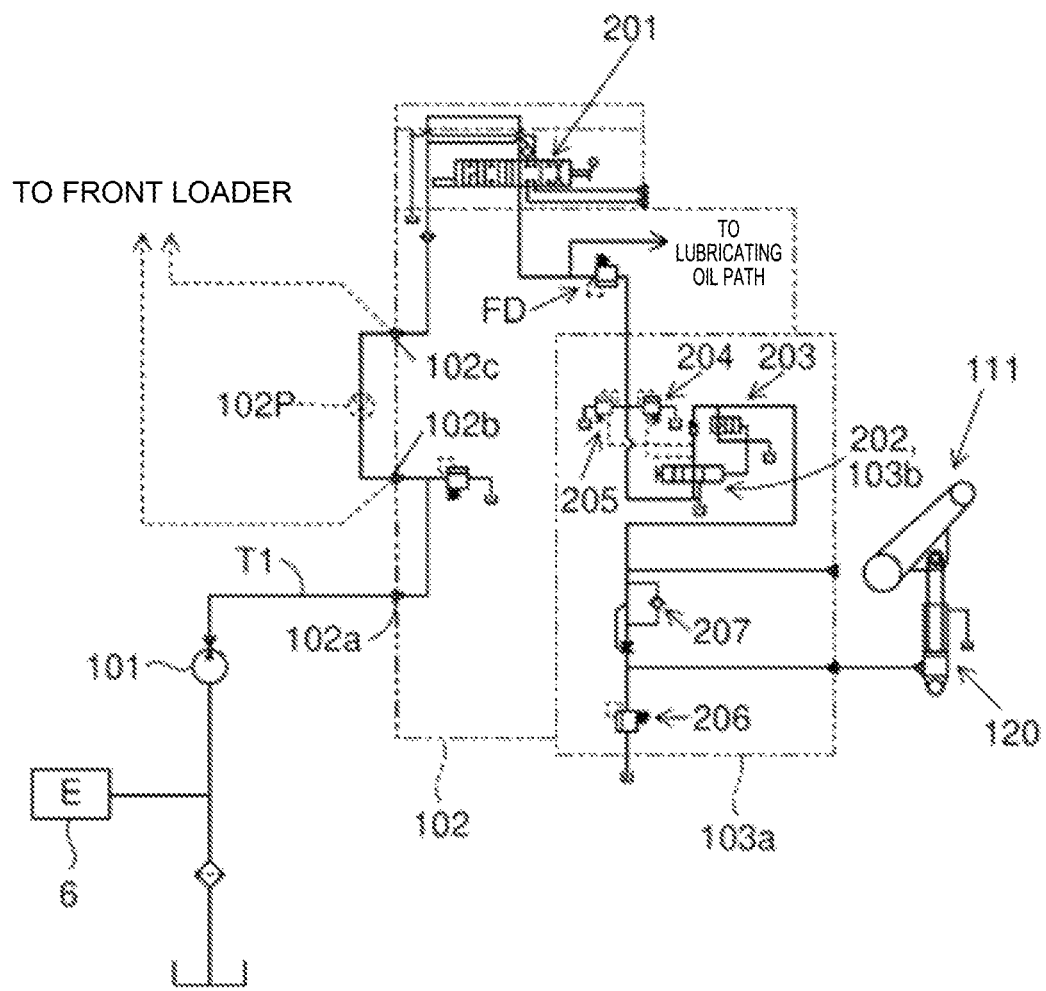
FIG. 11 is an illustration of a hydraulic circuit of the tractor.

FIG. 11 is an illustration of a hydraulic circuit of the tractor 1. When the gear pump 101 is driven by the engine 6, the lift arm 111 is driven to be lifted and lowered by the hydraulic oil supplied by the gear pump 101. More details are as follows.

The hydraulic oil discharged from the gear pump 101 is supplied to a first port 102*a* of the first valve plate 102 via the pressure oil pipe T1, and then to an external take-out valve 201 via a second port 102*b*, the external take-out port 102P, and a third port 102*c*, in that order.

Here, when a work instrument such as a front loader is mounted to the tractor 1, the second port 102*b* and the third port 102*c* are connected to a hydraulic system of the work instrument via piping, respectively. This allows the work instrument to be driven. An other work equipment can also be driven by connecting the other work equipment with piping to the external take-out port 102P.

The hydraulic oil supplied to the external take-out valve 201 is divided by a flow dividing valve FD into hydraulic oil (first hydraulic oil) to be supplied to the lift cylinder 120 and surplus hydraulic oil (second hydraulic oil). The first hydraulic oil is supplied to the second valve plate 103*a* via the pressure oil pipe T2 (see FIG. 9). The second valve plate 103*a* is provided with switching valves 202 and 203 that switch supply and discharge of hydraulic oil to and from the lift cylinder 120. Relief valves 204, 205 and 206 are also incorporated in the second valve plate 103*a*.

Here, the switching valve 202 consists of the mechanical lifting-lowering valve 103*b* described above. The mechanical lifting-lowering valve 103*b* is operated by the operation levers LV provided in the driver seat area 7 (see FIG. 1). The mechanical lifting-lowering valve 103*b* adjusts a flow rate of the hydraulic oil (first hydraulic oil) supplied from the second valve plate 103*a* to the lift cylinder 120 in response to operations of the operation levers LV.

The first hydraulic oil supplied to the second valve plate 103*a* and flowing through the switching valves 202 and 203 is supplied to the lift cylinder 120 through a slow return valve 207.

Thus, the lift arm 111 is driven to be lifted and lowered.

Figure 12:
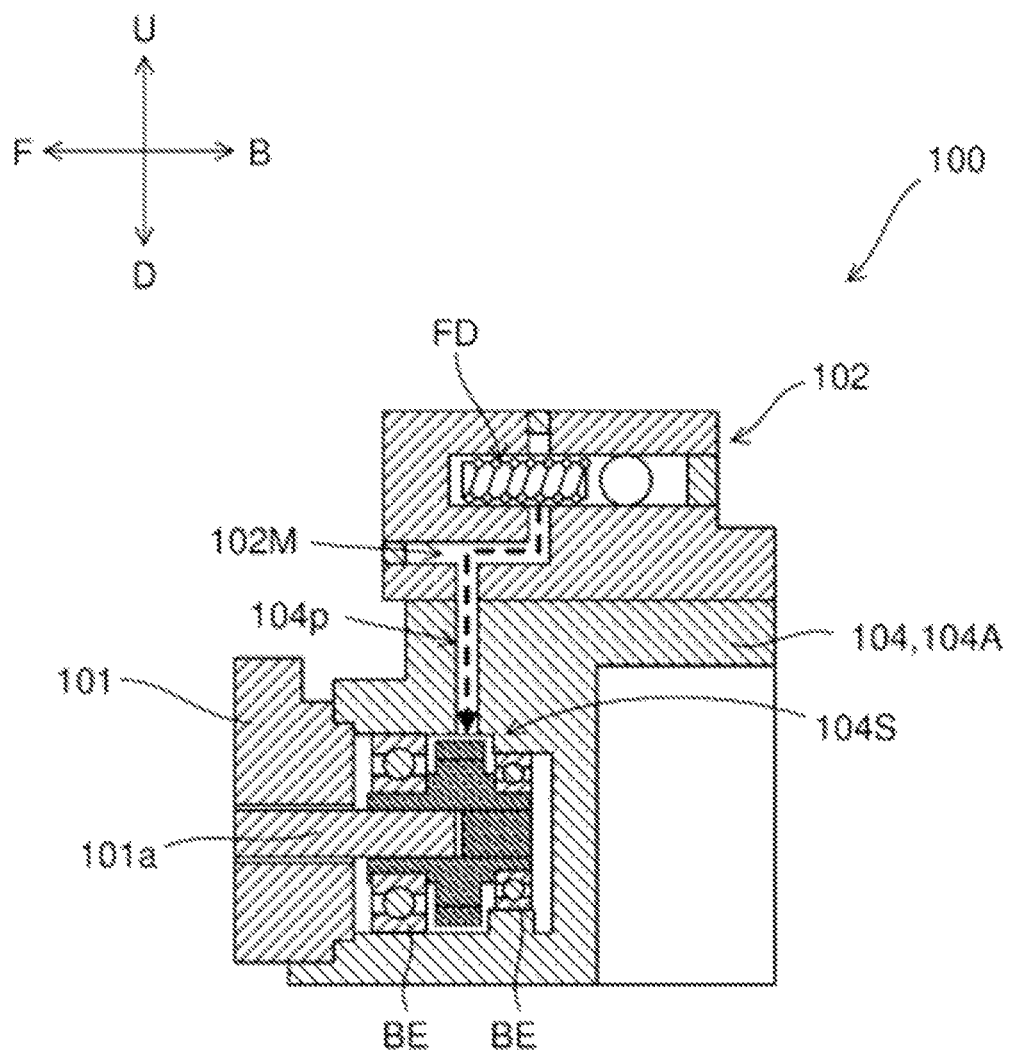
FIG. 12 is a cross-sectional view schematically illustrating cross sections of a gear pump, the first valve plate, and the lift housing in the hydraulic lift unit.

FIG. 12 is a schematic view illustrating cross sections of the gear pump 101, the first valve plate 102, and the lift housing 104. The second hydraulic oil divided by the flow dividing valve FD of the first valve plate 102 is led to a lubricating oil path 102M and supplied to a support part 104S of the rotating shaft 101*a* of the gear pump 101 through a through hole 104*p* provided in the lift housing 104, as illustrated in the same figure. In other words, in the lift housing, the through hole 104*p* is connected to the lubricating oil path 102M and extends toward the support part 104S. The support part 104S includes a bearing BE that rotatably supports the rotating shaft 101*a* of the gear pump 101. By supplying the second hydraulic oil to the support part 104S, the second hydraulic oil is used as a lubricant for the rotating shaft 101*a* of the gear pump 101, the bearing BE, a gear provided on the rotating shaft 101*a* (first gear), a gear engaged with the first gear (second gear), etc.

As described above, using the mechanical lifting-lowering valve 103*b* as the switching valve 202 can be less costly than, for example, using an electronically controlled valve. By using the gear pump 101, it is possible that the gear pump 101 is mounted on the lift housing 104 and operated as the hydraulic lift unit 100, that is, operated at a unit level.

In order to secure the oil paths for supplying hydraulic oil to the mechanical lifting-lowering valve 103*b*, a casting block (first valve plate 102, second valve plate 103*a*) different from the lift housing 104 is used in the present embodiment. As a result, oil path machining is aggregated in the casting block, thereby eliminating need for complex oil path machining in the lift housing 104, which is a large casting. Therefore, there is rarely need to concern about oil leakage due to casting cavities in the lift housing 104 when oil path machining is performed. Also, man-hours required to replace the lift housing 104 due to defects are reduced.

In addition, by providing the flow dividing valve FD downstream of the external take-out port 102P in the first valve plate 102 and using the surplus oil (second hydraulic oil) as a lubricating oil for the rotating shaft 101*a* of the gear pump 101, the gears, the bearing BE, etc., the surplus oil can be effectively used as the lubricating oil and a lubrication function can be completed at a unit level (single hydraulic lift unit 100).

[5. Appendices]

The tractor 1 having been described in the present embodiment can also be expressed as a work vehicle as illustrated in the following appendices.

The work vehicle of Appendix (1) comprises a parking brake lever, right and left braking arms, and an intermediate link mechanism coupling the parking brake lever and each of the braking arms, wherein the intermediate link mechanism includes a support shaft that rotates, left and right coupling units that are coupled to the support shaft and rotate each of the braking arms in response to a rotational movement of the support shaft, and a cable mechanism having a control cable, and the cable mechanism rotates the support shaft via the control cable in response to a rotational movement of the parking brake lever.

The work vehicle of Appendix (2) is a work vehicle as described in Appendix (1), wherein the support shaft is located extending in a left-right direction, the braking arm on a left side is coupled to a left end part of the support shaft via the coupling unit on the left side, and the braking arm on a right side is coupled to a right end part of the support shaft via the coupling unit on the right side.

The work vehicle of Appendix (3) is a work vehicle as described in Appendix (2), wherein the cable mechanism further includes a coupling arm mounted to a central part of the support shaft in the left-right direction, one end part of the control cable is coupled to the parking brake lever, and an other end part of the control cable is coupled to the coupling arm.

The work vehicle of Appendix (4) is a work vehicle as described in any of Appendices (1) to (3), which further comprises a driver's seat, and a transmission case that is located below the driver's seat, wherein the support shaft is located between the driver's seat and the transmission case.

The work vehicle of Appendix (5) is a work vehicle as described in Appendix (4), which further comprises a floor surface part that is located in front of and below the driver's seat, and a support plate rising from a rear end part of the floor surface part toward a front of the driver's seat, wherein the support plate has an opening, and a lid that closes or opens the opening.

The work vehicle of Appendix (6) is a work vehicle as described in Appendix (4) or (5), which further comprises a speed change lever that is connected the transmission case, and a cover member that is located below the speed change lever.

The work vehicle of Appendix (7) is a work vehicle as described in Appendix (6), wherein the speed change lever includes an auxiliary speed change lever, and the cover member is located below the auxiliary speed change lever.

The work vehicle of Appendix (8) is a work vehicle as described in any of Appendices (4) to (7), which further comprises a hydraulic lift unit located above the transmission case, wherein the hydraulic lift unit has a discharge pump (gear pump 101) that discharges hydraulic oil, a valve plate (first valve plate 102) connected to the discharge pump and having a plurality of oil paths, a lift cylinder (lift cylinder 120) driven by the hydraulic oil discharged from the valve plate, and a lift housing (lift housing 104) that supports the discharge pump and the valve plate, the valve plate has a flow dividing valve (flow dividing valve FD) that divides the hydraulic oil into a first hydraulic oil that is supplied to the lift cylinder and a second hydraulic oil that is surplus, and a lubricating oil path (lubricating oil path 102M) through which the second hydraulic oil flows, and the lift housing has a support part (support part 104S) that supports a rotating shaft (rotating shaft 101A) of the discharge pump and a through hole (through hole 104p) that is connected to the lubricating oil path and extends toward the support part.

The embodiment of the present invention has been described above. However, the scope of the invention is not limited thereto. The invention can be carried out within an extended or modified range without departing from the gist of the invention.

INDUSTRIAL APPLICABILITY

The present invention can be used for the work vehicles such as the tractor.

REFERENCE SIGNS LIST

1: Tractor (work vehicle)
9: Driver's seat
13: Transmission case
21: Parking brake lever
22: Main speed change lever (speed change lever)
23: Auxiliary speed change lever (speed change lever)
25: Floor surface part
25B: Rear end part
26: Support plate
26$a$: Opening
26$b$: Lid
31, 31L, 31R: Braking arm
40: Intermediate link mechanism
41: Support shaft
41 EL: Left end part
41 ER: Right end part
42, 42L, 42R: Coupling unit
43: Cable mechanism
43$a$: Control cable
49: Coupling arm
61: Cover member
SL: Speed change lever

The invention claimed is:

1. A work vehicle comprising:
a parking brake lever;
right and left braking arms; and
an intermediate link mechanism coupling the parking brake lever and each of the right and left braking arms, wherein the intermediate link mechanism includes:
a support shaft that is configured to rotate;
left and right coupling units that are coupled to the support shaft and are configured to rotate each of the right and left braking arms in response to a rotational movement of the support shaft; and
a cable mechanism having a control cable, and
wherein the cable mechanism is configured to rotate the support shaft via the control cable in response to a rotational movement of the parking brake lever.

2. The work vehicle according to claim 1, wherein:
the support shaft extends in a left-right direction,
a left braking arm of the right and left braking arms on a left side is coupled to a left end part of the support shaft via a left coupling unit of the left and right coupling units on the left side, and
a right braking arm of the right and left braking arms on a right side is coupled to a right end part of the support shaft via a right coupling unit of the left and right coupling units on the right side.

3. The work vehicle according to claim 2, wherein:
the cable mechanism further includes a coupling arm mounted to a central part of the support shaft in the left-right direction,
one end part of the control cable is coupled to the parking brake lever, and
another end part of the control cable is coupled to the coupling arm.

4. The work vehicle according to claim 1, further comprising:
seat for a driver; and
a transmission case that is located below the seat, and wherein the support shaft is located between the seat and the transmission case.

5. The work vehicle according to claim 4, further comprising:

a floor surface part that is located in front of and below the seat; and a support plate rising from a rear end part of the floor surface part toward a front of the seat, wherein the support plate has:

an opening; and a lid that is configured to close or open the opening.

6. The work vehicle according to claim 4, further comprising:

a speed change lever that is connected to the transmission case; and a cover member that is located below the speed change lever.

7. The work vehicle according to claim 6, wherein;

the speed change lever includes an auxiliary speed change lever, and the cover member is located below the auxiliary speed change lever.

* * * * *